(12) United States Patent
Kang et al.

(10) Patent No.: US 10,789,170 B2
(45) Date of Patent: Sep. 29, 2020

(54) STORAGE MANAGEMENT METHOD, ELECTRONIC DEVICE AND COMPUTER READABLE MEDIUM

(71) Applicant: EMC IP Holding Company LLC, Hopkinton, MA (US)

(72) Inventors: Jianbin Kang, Beijing (CN); Hongpo Gao, Beijing (CN); Jian Gao, Beijing (CN); Lei Sun, Beijing (CN); Xiongcheng Li, Beijing (CN); Sheng Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/196,692

(22) Filed: Nov. 20, 2018

(65) Prior Publication Data
US 2019/0332540 A1 Oct. 31, 2019

(30) Foreign Application Priority Data
Apr. 28, 2018 (CN) .......................... 2018 1 0401726

(51) Int. Cl.
| | |
|---|---|
| *G06F 12/0871* | (2016.01) |
| *G06F 12/0873* | (2016.01) |
| *G06F 12/0864* | (2016.01) |
| *G06F 12/02* | (2006.01) |
| *G06F 12/0868* | (2016.01) |

(52) U.S. Cl.
CPC ...... *G06F 12/0871* (2013.01); *G06F 12/0246* (2013.01); *G06F 12/0864* (2013.01); *G06F 12/0868* (2013.01); *G06F 12/0873* (2013.01); *G06F 2212/225* (2013.01); *G06F 2212/313* (2013.01); *G06F 2212/608* (2013.01)

(58) Field of Classification Search
CPC .......... G06F 12/0873; G06F 2212/608; G06F 12/0246; G06F 2212/225; G06F 12/0871; G06F 2212/313; G06F 12/0868; G06F 12/0864; G06F 2212/1016
USPC ......................................... 711/113
See application file for complete search history.

(56) References Cited

U.S. PATENT DOCUMENTS

2014/0047170 A1 2/2014 Cohen et al.
2019/0258568 A1* 8/2019 Park ........................ G06F 3/061

\* cited by examiner

*Primary Examiner* — David Yi
*Assistant Examiner* — Zubair Ahmed
(74) *Attorney, Agent, or Firm* — BainwoodHuang

(57) ABSTRACT

Various techniques are directed to a storage management method, an electronic device and a computer readable medium. Such techniques may involve: receiving a request for a target storage block in a disk; obtaining, from a cache, a cache indicator indicating a state of a group of storage blocks including the target storage block, the number of bits occupied by the cache indicator in the cache being less than the number of storage blocks in the group of storage blocks; and responding to the request based on the cache indicator. Such techniques can reduce times of access to the disk and thereby enhancing input/output performance.

21 Claims, 7 Drawing Sheets

US 10,789,170 B2

STORAGE MANAGEMENT METHOD, ELECTRONIC DEVICE AND COMPUTER READABLE MEDIUM

FIELD

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure relate to the field of data storage, and more specifically to a storage management method, an electronic device and a computer readable medium.

BACKGROUND

A solid-state disk (SSD) is a non-volatile storage device that stores persistent data on a solid-state flash memory. An SSD has an array of semiconductor memory organized as a disk, using integrated circuits (ICs) rather than magnetic or optical storage media. An SSD may also be referred to as a solid-state disk. The solid-state disk has characteristics such as quick read/write, light weight, low energy consumption and small size, which are not possessed by a conventional mechanical disk. However, the solid-state disk does not allow overwrite. Furthermore, due to the limited number of erasing times, the durability (service life) of the solid-state disk is relatively short.

A garbage collection mechanism of the solid-state disk usually causes a write amplification factor larger than 1. To reduce the write amplification factor, currently an UNMAP command is introduced in some solid-state disks to allow an operation system to inform the solid-state disk which data is no longer in use and can be wiped internally. With an introduction of the UNMAP command, the SSD can erase a storage block directly when data is written to the storage block again, thereby reducing the write amplification factor. In addition, the UNMAP command also increases the lifetime of the SSD since the amount of data movement happened in the garbage collection of the SSD at the background is reduced. However, when the load of input/output of the SSD becomes high, system performance thereof will drop due to the usage of the UNMAP command.

SUMMARY

Embodiments of the present disclosure provide a storage management method, an electronic device and a computer readable storage medium, which can improve the performance of the storage system. It should be understood that the term electronic device may refer to electronic circuitry, electronic modules, arrays, apparatus, and/or other equipment, combinations thereof, and so on.

According to a first aspect of the present disclosure, there is provided a storage management method. The method includes: receiving a request for a target storage block in a disk; obtaining, from a cache, a cache indicator indicating a state of a group of storage blocks including the target storage block, the number of bits occupied by the cache indicator in the cache being less than the number of storage blocks in the group of storage blocks; and responding to the request based on the cache indicator.

According to a second aspect of the present disclosure, there is provided an electronic device. The electronic device includes a processor and a memory, the memory storing instructions therein, the instructions, when executed by the processor, causing the electronic device to perform the following acts: receiving a request for a target storage block in a disk; obtaining from a cache a cache indicator indicating a state of a group of storage blocks including the target storage block, the number of bits occupied by the cache indicator in the cache being less than the number of storage blocks in the group of storage blocks; and responding to the request based on the cache indicator.

According to a third aspect of the present disclosure, there is provided a computer readable storage medium with machine-executable instructions stored thereon, the machine executable instructions, when executed, causing a machine to perform the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objects, features, advantages of example embodiments of the present disclosure will become more apparent. In the drawings, identical or similar reference numbers represent the same or similar elements, in which.

DETAILED DESCRIPTION OF EMBODIMENTS

Figure 1:
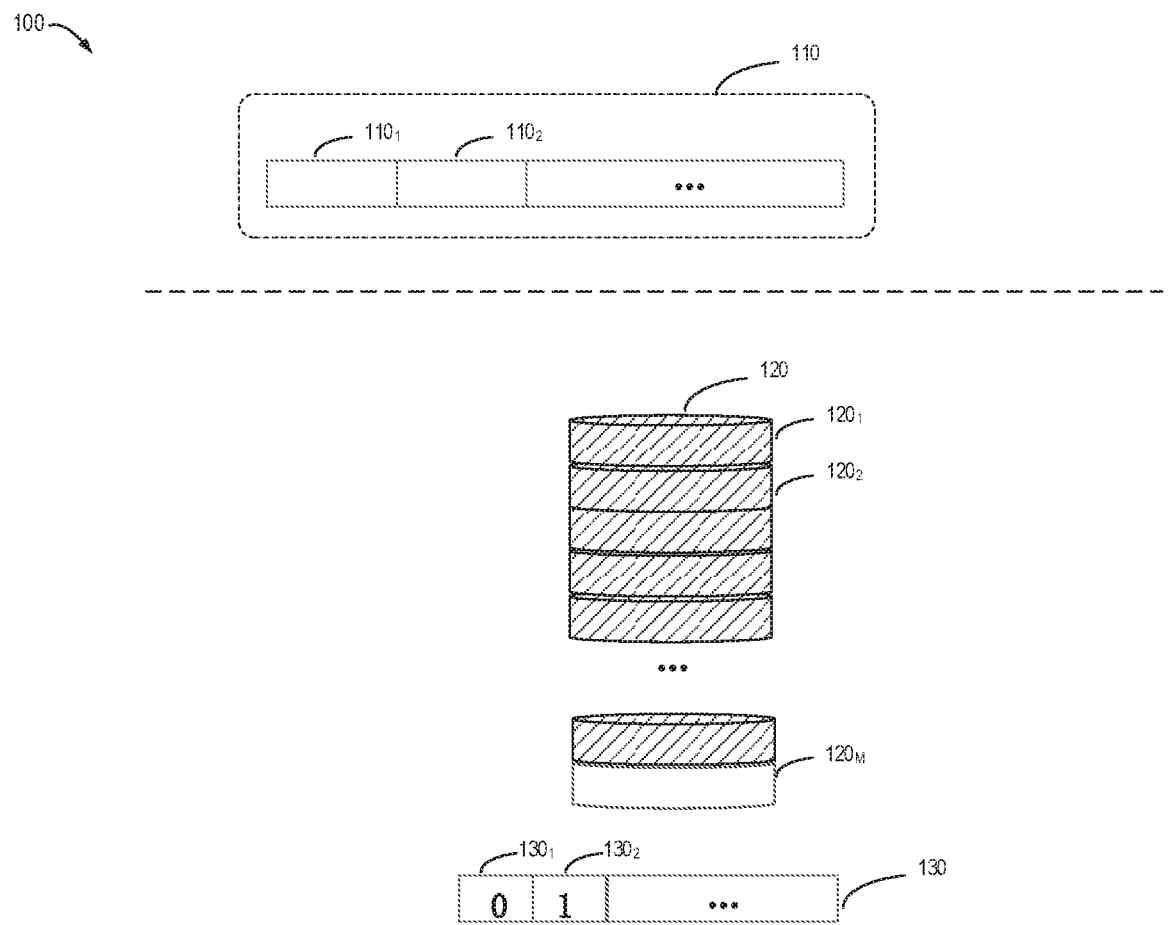
FIG. 1 illustrates a schematic diagram of an architecture for implementing an UNMAP mechanism in a conventional solution.

The preferred embodiments of the present disclosure will be described in more details with reference to the drawings. Although the preferred embodiments of the present disclosure are illustrated in the drawings, it should be understood that the present disclosure can be implemented in various manners and should not be limited to the embodiments explained herein. On the contrary, the embodiments are provided to make the present disclosure more thorough and complete and to fully convey the scope of the present disclosure to those skilled in the art.

As stated above, to reduce the write amplification factor of the solid-state disk system, currently an UNMAP command is introduced in some solid-state disk systems. FIG. 1 illustrates a schematic diagram of an architecture 100 for implementing an UNMAP mechanism in the conventional solution.

As shown in FIG. 1, the architecture 100 is divided into a logical layer including a logical space 110 and a physical layer including a solid-state disk 120. The solid-state disk 120 may be divided into a plurality of non-overlapping blocks $120_1$, $120_2$, $120_M$ (M is any natural number) in a fixed size. These blocks can be called storage blocks. In actual implementation, depending on practical application and the limitation of storage, the storage blocks may be set in different sizes. These storage blocks are further divided into storage blocks (e.g., storage blocks $120_1$, $120_2$) for storing user data and standby storage blocks (e.g., storage block $120_M$). The standby block $120_M$ may be used for garbage collection, or may also be used to store some metadata. Although FIG. 1 only illustrates one standby block $120_M$, according to actual needs, more than one standby block may be set.

The logical space 110 is divided into a series of continuous logical blocks $110_1$, $110_2$. An application (not shown in FIG. 1) accesses storage blocks $120_1$, $120_2$ in the solid-state disk 120 by using logical addresses of logical blocks $110_1$, $110_2$ in the logical space 110. For example, when the application uses the logical address of the logical block $110_1$ to write data to the solid-state disk 120, the solid-state disk 120 will allocate one of its free storage blocks (e.g., storage block $120_1$) to the application so as to establish a mapping between the logical block $110_1$ and the storage block $120_1$. This mapping is recorded in a mapping table. The storage block $120_1$ to which the logical block $110_1$ is mapped can be determined by looking up the mapping table.

In order to implement the UNMAP mechanism, indicators indicating whether the mappings of the storage blocks $120_1$, $120_2$ to respective logical blocks are cancelled are stored in a metadata region 130 of the standby block $120_M$. For example, as shown in FIG. 1, a first indicator $130_1$ in the metadata region 130 is used to represent whether the mapping of storage block $120_1$ to a logical block (e.g., logical block $110_1$) is already cancelled, and a second indicator $130_2$ represents whether the mapping of the storage block $120_2$ to a logical block is already cancelled, and so on. For example, "0" may be used to represent a state in which one storage block is already mapped to one logical block (hereinafter referred to as a mapped state), and "1" may be used to represent a state in which an existing mapping between one storage block and one logical block is cancelled (hereinafter referred to as an unmapped state). As shown in FIG. 1, the indicator $130_1$ in the metadata region 130 is "0", which indicates that the storage block $120_1$ is in the mapped state; the indicator $130_2$ is "1", which indicates that the storage block $120_2$ is in the unmapped state. Certainly, it is also possible to use "0" to represent the unmapped state, and "1" to represent the mapped state.

At an initial stage, indicators $130_1$, $130_2$ indicating states of the storage blocks $120_1$, $120_2$ in the metadata region 130 may be set as indicating the unmapped state. When data is written to a certain storage block (e.g., storage block $120_1$), the indicator indicating the state of the storage block $120_1$ in the metadata region 130 is modified to indicating the mapped state. When an application sends an UNMAP command with respect to a certain logical block (e.g., logical block $110_1$), first, by looking up the mapping table, a storage block (e.g., the storage block $120_1$) corresponding to the logical block is found, then the indicator $130_1$ indicating the state of the storage block $120_1$ in the metadata region 130 is modified from the mapped state to the unmapped state, e.g., from "0" to "1".

Under the architecture 100, when a user sends a read request to the solid-state disk 120, first, it is necessary to check an indicator in the metadata region 130 indicating a state of a storage block associated with the read request. If the indicator indicates that the storage block is in the mapped state, read the data from the storage block. If the indicator indicates that the storage block is in the unmapped state, data is directly returned with zero.

When a user sends a write request to the solid-state disk 120, first, it is necessary to check an indicator in the metadata region 130 indicating a state of the storage block associated with the write request. If the indicator indicates that the storage block is in the mapped state, write the data to the storage block. If the indicator indicates that the storage block is in the unmapped state, the storage block is filled with zero, and then is written with the user data, and the indicator indicating the unmapped state is modified to indicate the mapped state.

It can be seen that, under the architecture 100, no matter whether to perform a reading or writing to the solid-state disk 120, first, it is necessary to access the indicator in the metadata region 130 of the solid-state disk 120, and then data read or data write is performed. Since it is necessary to additionally access the metadata region 130 in the solid-state disk 120 so as to obtain the state of a storage block, and the number of read/write times of the solid-state disk per second is limited, thereby inevitably causing the speed of read/write slow. In the case of a relatively heavy load of input/output, the performance of a system substantially falls.

Considering this, a storage management solution is provided according to some embodiments of the present disclosure. By using the solution, the number of times of access to disks such as solid-state disks can be reduced, thereby improving the performance of input/output. In the solution, according to some embodiments of the present disclosure, storage blocks in the disk are divided into several groups of storage blocks. For each group of storage blocks, the number of bits used in the cache to represent the state of the group of storage blocks is less than the number of storage blocks in the group of storage blocks. When a read/write request for a target storage block is received, the state of one group of storage blocks including the target storage block is obtained from the cache, and based on the state, whether to access the disk to obtain an actual state of the target storage block is determined before responding to the read/write request.

In the solution of the embodiments of the present disclosure, when it is determined based on the indicator indicating the state of the group of storage block in the cache that it is unnecessary to access the actual state of the target storage block, it is possible to directly respond to the read/write request without accessing the metadata in the disk, thereby reducing additional number of times of accessing to the disk. In the case of a relatively heavy input/out load or in the case that the number of input/output times of the disk per second is limited, the solution of the embodiments of the present disclosure can substantially improve the input/output performance. Furthermore, in the solution of the embodiments of the present disclosure, in the cache, the state of one group of storage blocks is represented by using a number of bits which in number is less than the number of blocks of the group of storage blocks, which considers the capacity limitation of the cache while improving the read/write speed, thereby saving the cache resource to a certain degree.

Embodiments of the present disclosure will be described in detail with reference to FIG. 2 through FIG. 8. However, it needs to be understood that these depictions are only used for illustration purpose, and the present disclosure is not limited to these embodiments and details in the figures.

Figure 2:
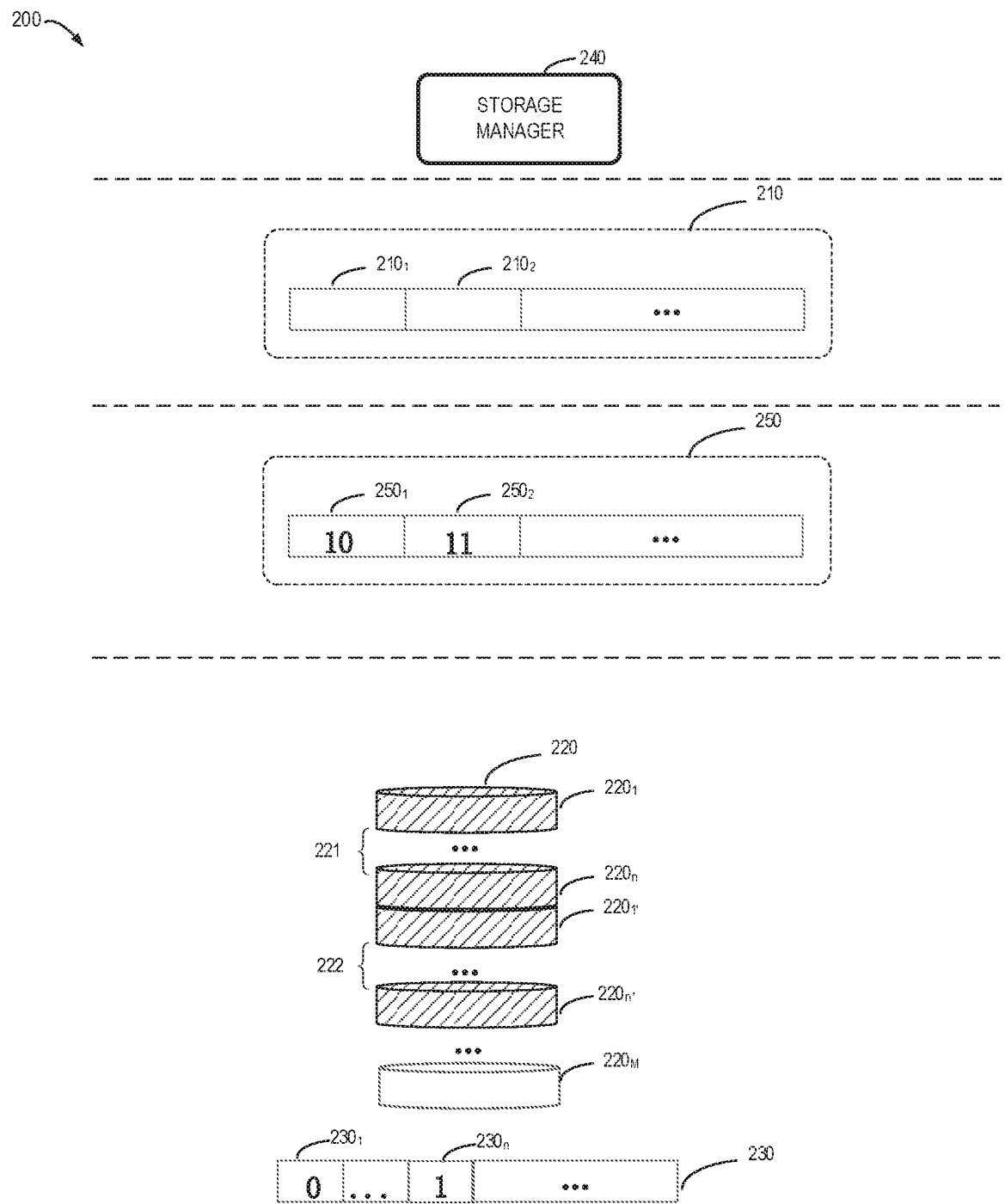
FIG. 2 illustrates a schematic diagram of an example running environment in which embodiments of the present disclosure can be implemented.

FIG. 2 illustrates a schematic diagram of an example running environment 200 in which embodiments of the present disclosure can be implemented. It should be understood that the environment 200 as shown in FIG. 2 is only an example in which the implementation of the present disclosure may be used to implement, and is not intended to limit the application environment and scenarios of the present disclosure. Embodiments of the present disclosure are also adapted for other environments or architectures.

As shown in FIG. 2, the environment 200 may include a logical layer including a logical space 220 and a physical layer including a disk 220 (e.g., solid-state disk or other disks implemented using integrated circuit technology). The disk 220 may be divided into a series of non-overlapping storage blocks $220_1$ to $220_M$ (M is any natural number) in a fixed size. These storage blocks are further divided into storage blocks (e.g., storage blocks $220_1$ to $220_n$, $220_{1'}$ to $220_{n'}$) used for storing user data and standby storage blocks (e.g., storage block $220_M$). Although FIG. 2 only illustrates one standby block $220_M$, those skilled in the art appreciate that the embodiments of the present disclosure are not limited one standby block, instead, more than one standby block may be set according to actual needs.

Although FIG. 2 only illustrates one disk 220, this is by way of example only and embodiments of the present disclosure are not limited to this. For example, in other embodiments of the present disclosure, more than one disk may be included, and these disks may be organized into Redundant Arrays of Independent Disks (RAID).

Similar to the logical space 110 in FIG. 1, the logical space 210 is also divided into a series of continuous logical blocks $210_1$, $210_2$. An application accesses storage blocks in the disk 220 through the logical addresses of logical blocks $210_1$, $210_2$ in the logical space 210. For example, when the application uses the logical address of the logical block $210_1$ to write data to the disk 220, the disk 220 will allocate one of its free storage blocks (e.g., storage block $220_1$) to the application so as to establish a mapping between the logical block $210_1$ and storage block $220_1$. Similar to FIG. 1, this mapping is recorded in the mapping table. The storage block $220_1$ to which the logical block $210_1$ is mapped can be determined by looking up the mapping table.

There is one metadata region 230 in the standby block $220_M$. Regarding each storage block (e.g., storage blocks $220_1$ to $220_n$, $220_{n'}$ to $220_{n'}$) used for storing the user data, an indicator in the metadata region 130 is used to represent whether the storage block is in the unmapped state. As shown in FIG. 2, the indicator $230_1$ in the metadata region 130 is "0", which indicates that the storage block $220_1$ is in the mapped state; the indicator $230n$ is "1", which indicates that the storage block $220_n$ is in the unmapped state. Certainly, it is also possible to use "0" to represent the unmapped state, and "1" to represent the mapped state. Definitions and arrangement manners of the mapped state and unmapped state are similar to those described with reference to FIG. 1, and thus will not be detailed here.

Different from the architecture 100, in the embodiments of the present disclosure, storage blocks used for storing user data in the disk 220 are divided into a plurality of groups. As shown in FIG. 2, storage blocks $220_1$-$220_n$ are directed into the first group 221 of storage blocks, and storage blocks $220_{1'}$-$220_{n'}$ are directed to the second group 222 of storage blocks. In some embodiments of the present disclosure, n may be 32. Those skilled in the art appreciate that 32 is by way of example only and does not limit the scope of the present disclosure. n may be any integer larger than 1, depending on specific applications and design constraints of systems. Those skilled in the art should also appreciate that although only the first group 221 of storage blocks and the second group 222 of storage blocks are shown, and the first group 221 of storage blocks and the second group 222 of storage blocks are shown as including the same number of storage blocks, embodiments of the present disclosure are not limited to two groups of storage groups, and the number of storage blocks included in each group may vary. Although successive storage blocks are directed into one group as shown in FIG. 2, this is by way of example only and the embodiments of the present embodiments are not limited to this.

The environment 200 further uses a cache 250 to store indicators indicating the state of the first group 221 of storage blocks and second group 222 of storage blocks respectively (they are hereinafter referred to as cache indicators). For each group 221, 222 of storage blocks in the disk 220, the number of bits used in the cache 230 to represent the state of the group 221, 222 of storage blocks is less than the number of storage blocks in the group of storage blocks 221, 222. The state of a group of storage blocks may include a state in which the storage blocks of the group are all in the mapped state (hereinafter referred to as an all-mapped state), a state in which the storage blocks of the group are all in the unmapped state (hereinafter referred to as an all-unmapped state), and a state in which a part of storage blocks of the group are in the mapped state and storage blocks of another part are in the unmapped state (hereinafter referred to as a hybrid state).

In the example shown in FIG. 2, a cache indicator of 2-bit in the cache is used to represent a state of one group of storage blocks including n storage blocks. In this example, for example, "00" may be used to represent the all-unmapped state, "11" may be used to represent the all-mapped state, and "01" and "10" may be used to represent the hybrid state. For example, as shown in FIG. 2, a cache indicator $250_1$ occupying two bits is "10", which indicates that the corresponding first group 221 of storage blocks are in the hybrid state; a cache indicator $250_2$ occupying two bits is "11", which indicates that the corresponding second group 222 of storage blocks are in the all-mapped state. Those skilled in the art appreciate that using two bits to represent the state is by way of example only and embodiments of the present disclosure are not limited to this. According to actual needs, the number of bits used for representing the state of the group of storage blocks in the cache may be any natural number less than n.

The environment 200 further includes a storage manager 240 for managing read/write operations to the disk 220 and modifications to cache indicators and metadata. The storage manager 240, after receiving a request for the target storage block in the disk 220 from an application, may access the cache indicator indicating the state of a group of storage blocks including the target storage block in the cache 250. The storage manager 240 may, based on the cache indicator, determine whether to access the metadata region 230 in the disk 220. When there is no need to access the metadata region 230, the storage manager 240 may directly respond to the request without accessing the metadata region 230. When it is needed to access the metadata region 230, the storage manager 240 may access the metadata region 230 to obtain the state of the target storage block, and respond to the request based on the target state, and if necessary, correspondingly modify the indicator indicating the state of the target storage block in the metadata region 130 and the indicator indicating the state of the group of storage blocks including the target storage block in the cache 230.

In the embodiments of the present disclosure, the storage manager 240, determine whether to access the metadata region 230 in the disk 220 by using a cache indicator occupying less space than the space occupied by the cache 230, and when there is no need to access the metadata region 230 in the disk 220, the read/write request is responded directly. As such, extra accesses to the disk 220 are reduced, and the speed of read/write is improved.

Figure 3:
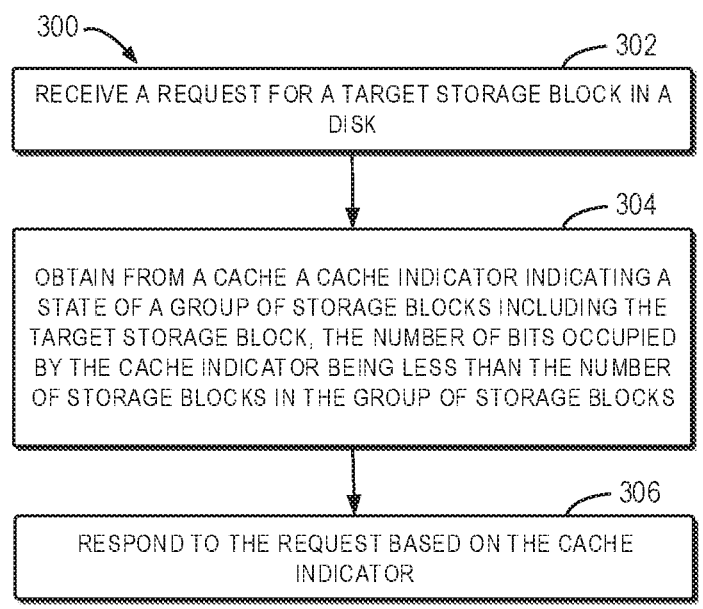
FIG. 3 illustrates a flow chart of a storage management method according to some embodiments of the present disclosure.

FIG. 3 illustrates a flow chart of a storage management method 300 according to some embodiments of the present disclosure. The method 300 may be executed by the storage manager 240 shown in FIG. 2.

At block 302, the storage manager 240 receives a request for a target storage block in the disk 220. The storage manager 240 may receive from a user a read request to read data in the target storage block. The storage manager 240 may also receive from a user a write request to write data to the target storage block. For example, the user may request to read a document stored in the target storage block or request to edit the document. In another example, a user may request to look up or print an image stored in the target storage block.

At block 304, the storage manager 240 obtains, from the cache 250, a cache indicator indicating the state of the group of storage blocks including the target storage block. The number of bits occupied by the cache indicator in the cache is less than the number of storage blocks in the group of storage blocks.

In the embodiments of the present disclosure, the state of one storage block may include the mapped state in which the storage block is mapped to a logical block and the unmapped state in which the mapping between the storage block and the logical block is cancelled. The cache indicator may indicate an all-mapped state in which the storage blocks of the group are all in the mapped state, an all-unmapped state in which the storage blocks of the group are all in the unmapped state, and a hybrid state in which part of storage blocks of the group are in the mapped state and storage blocks of another part are in the unmapped state.

In the embodiments of the present disclosure, at an initial stage, regarding each group of storage blocks used for storing user data in the disk 220, the storage manager 240 may initially set the cache indicator of a group of storage blocks by reading, from the metadata region 230 in the disk 220, the indicator indicating the state of each of the storage blocks in the group of storage blocks. If all the storage blocks in the group of storage blocks are in the mapped state, the cache indicator for the group of storage blocks in the cache 220 may be set as indicating the all-mapped state. If all storage blocks in the group of storage blocks are in the unmapped state, the cache indicator for the group of storage blocks in the cache 220 may be set as indicating the all-unmapped state. If the group of storage blocks includes storage blocks in the mapped state as well as storage blocks in the unmapped state, the cache indicator for the group of storage blocks in the cache 220 may be set as indicating the hybrid state.

In the embodiments of the present disclosure, it is not the case that the state of each storage block in a group of storage blocks is stored in the cache 250, but instead the number of bits used to represent an overall state of the group of storage blocks is less than the number of storage blocks of the group of storage blocks. As such, it is possible save cache resource while using the cache 250 to reduce extra access to the disk 220.

At block 306, the storage manager 240 responds to the received request based on the cache indicator. In the embodiments of the present disclosure, the storage manger 240 may, based on the cache indicator, determine whether to access the metadata region 230 in the disk 220 before responding to the request. If there is no need to access the metadata region 230 in the disk 220, the storage manager 240 may directly respond to the received request, thereby reducing extra access to the disk 220. This can improve the performance of input/output operations. In the case the number of input/output times of the disk 220 per second is limited, the performance is improved apparently.

Figure 4:
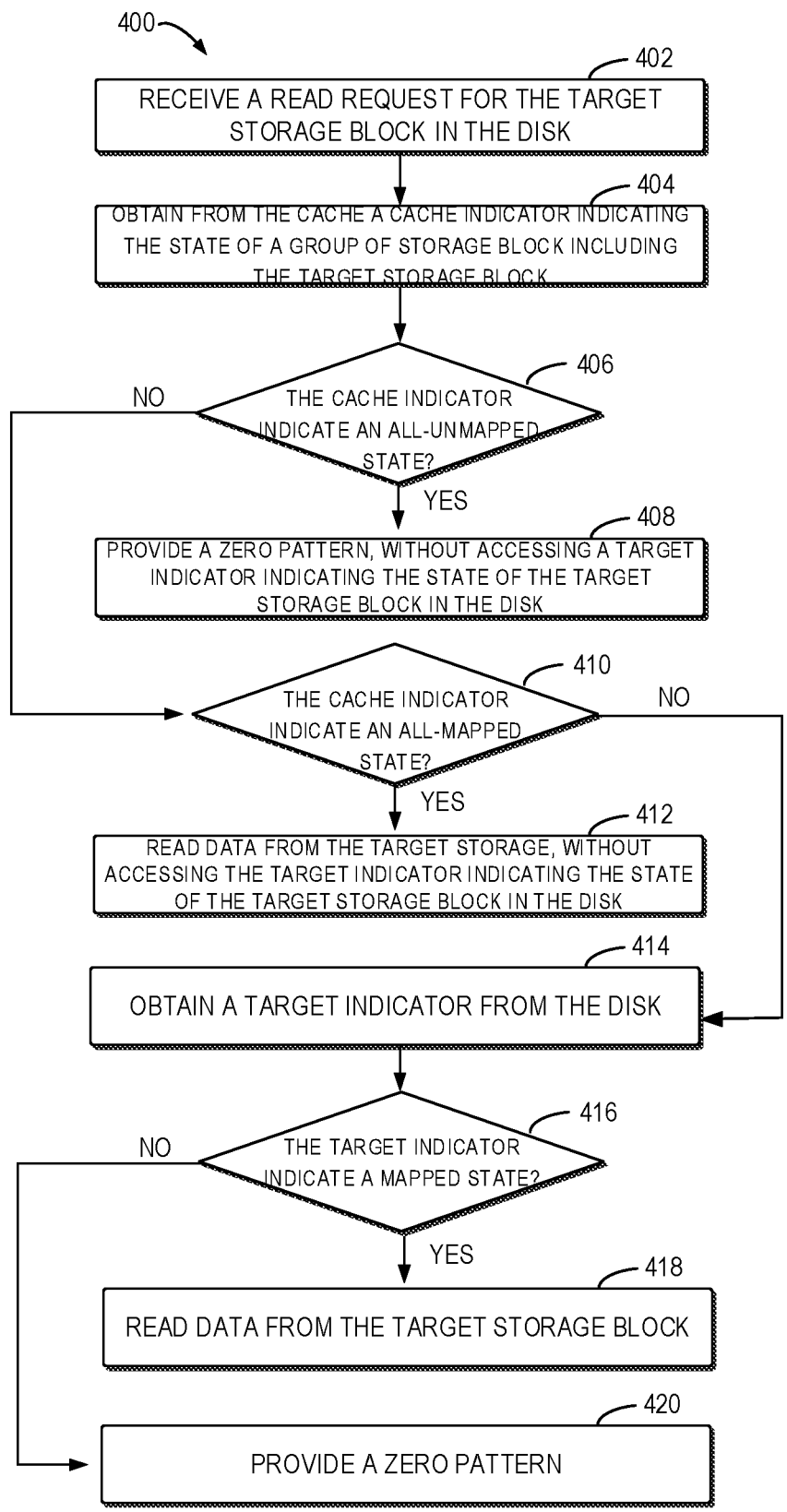
FIG. 4 illustrates a flow chart of a method of responding to a read request according to some embodiment of the present disclosure.

A method of responding to a read request and a method of responding to a write request will be described respectively with reference to FIG. 4 and FIG. 5. FIG. 4 illustrates a flow chart of a method 400 of responding to a read request according to some embodiments of the present disclosure. The method 400 may be executed by the storage manager 240 in FIG. 2.

At block 402, the storage manager 240 receives a read request for the target storage block in the disk 200. For example, the storage manager 240 may receive from the user a request to view documents, images and so on stored in the target storage block.

At block 404, the storage manager 240 obtains from the cache 250 a cache indicator indicating the state of a group of storage blocks including the target storage block, the number of bits occupied by the cache indicator being less than the number of storage blocks of the group of storage blocks. The number of bits used in the cache 250 to represent the state of the group of storage blocks is less than the number of storage blocks in the group of storage blocks. As such, it is possible to save the cache resource while achieving the object of the present disclosure. The content described in block 404 is similar to that described in block 304 shown in FIG. 3, and will not be detailed any more.

At block 406, the storage manager 240 determines whether the cache indicator indicates an all-unmapped state. As stated above, the all-unmapped state represents a state in which the mapping of the group of storage blocks to the logical blocks in their logical space is all cancelled. In the all-unmapped state, since the mappings of the storage blocks of the group to the logical blocks are all cancelled, data in the storage blocks is invalid.

At block 408, in response to the cache indicator indicating the all-unmapped state, the storage manager 240 returns a zero pattern, without accessing the target indicator indicating the state of the target storage block in the disk 220. As stated above, in the all-unmapped state, since the mappings of the storage blocks of the group to logical blocks are all cancelled, data in these storage blocks is already in an invalid state, and already-existing data in the target storage block is certainly invalid. In this case, the storage manager 240 directly returns the zero pattern, without accessing the disk 220. This ensures no access is performed to the disk 220 while correctly responding to the read request, thereby improving the speed of responding to the read request. In the case that the input/output load is relatively heavy, a remarkable performance advantage can be produced.

At block 410, in response to the cache indicator not representing the all-unmapped state, the storage manager 240 determines whether the cache indicator indicates the all-mapped state. As stated above, the all-mapped state is a state in which the storage blocks of the group are all mapped to corresponding logical blocks. In the all-mapped state, data in the group of storage block are all valid.

At block 412, in response to the cache indicator representing the all-mapped state, the storage manager 240 directly read from the target storage block the data associated with the read request, without accessing the target indicator indicating the state of the target storage block in the disk. Since it is known from the cache indicator that the storage blocks of the group are all in the mapped state and known that the target storage block is in the mapped state and the data in the target storage block are valid, in this case, the storage manager 240 may directly read data from the target storage block, and there is no need to obtain the state of the target storage block by accessing the metadata region 230 in the disk 220. In this way, it is possible to reduce extra access to the metadata region 230 in the disk 230, thereby improving the speed of responding to the read request.

At block 414, in response to the cache indicator not indicating the all-unmapped state and not indicating the all-mapped state, that is, the cache indicator representing the hybrid state, the storage manager 240 obtains, from the disk 220 (e.g., from the metadata region 230 in the disk 220), the target indicator indicating the state of the target storage block. As stated above, the hybrid state is a state in which a part of storage blocks in the group of storage blocks are in the mapped state and another part of storage blocks are in the unmapped state. In the case that the cache indicator represents the hybrid state, it is impossible to determine the state of the target storage block based on the cache indicator. Therefore, the storage manager 240 needs to access the metadata region 230 in the disk 220 to obtain the target indicator indicating the state of the target storage block.

At block 416, the storage manager determines whether the target indicator indicates a mapped state in which the target storage block is mapped to a logical block. At block 418, in response to the target indicator indicating the mapped state, the storage manager 240 read from the target storage block the data associated with the read request. In the case that the target indicator indicates the mapped state, the data in the target storage block is valid, and, as a response to the read request, the data in the target storage block can be returned to the user.

At block 420, in response to the target indicator not indicating the mapped state, that is, the target indicator indicating the unmapped state, the storage manager 240 returns a zero pattern. In the unmapped state, the mapping of the target storage block and the logical block is already cancelled. In this case, the data in the target storage block is no longer valid, therefore the zero pattern is returned to the user as a response to the read request.

In the method 400, for the read request, accessing to the metadata region 230 in the disk 220 is performed only in the case that cache indicator indicates the hybrid state; however, in the case that the cache indicator indicates the all-mapped state and the all-unmapped state, the read request is responded directly without accessing the target indicator in the disk 220, thereby providing a quick response to the read request. In this way, since the number of times of accessing the disk 220 is reduced generally, in the case that the input/output load is relatively heavy and the number of times of accessing the disk 220 per second is limited, a better input/output performance can be provided.

Figure 5:
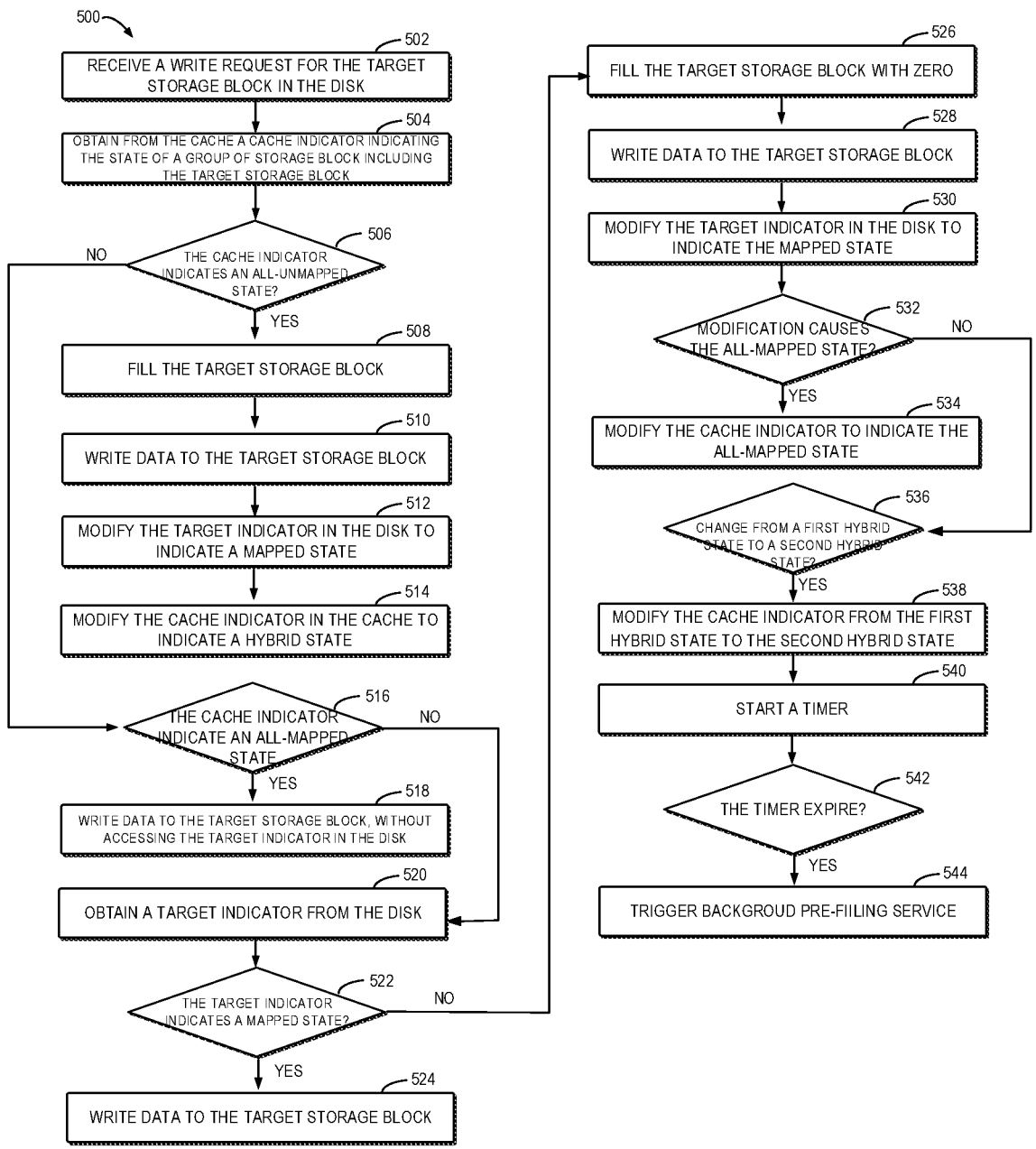
FIG. 5 illustrates a flow chart of a method of responding to a write request according to some embodiments of the present disclosure.

FIG. 5 illustrates a flow chart of a method 500 of responding to a write request according to some embodiments of the present disclosure. The method 500 may be executed by the storage manager 240 in FIG. 2.

At block 502, the storage manager 240 may receive a write request for the target storage block in the disk 200. For example, the storage manager 240 may receive from a user a request to edit a document stored in the target storage block.

At block 504, the storage manager 240 may obtain from the cache 250 a cache indicator indicating the state of a group of storage block including the target storage block, the number of bits occupied by the cache indicator in the cache being less than the number of storage blocks of the group of storage blocks. The number of bits used in the cache 250 to represent the state of the group of storage blocks is less than the number of storage blocks in the group of storage blocks. As such, it is possible save the cache resource while achieving the object of the present disclosure. The operation described in block 504 is similar to that described in block 304 in FIG. 3, and will not be detailed any more.

At block 506, the storage manager 240 may determine whether the cache indicator indicates an all-unmapped state. As stated above, the all-unmapped state represents a state in which the mapping of the group of storage blocks to the logical blocks in their logical space is all cancelled. In the all-unmapped state, since the mappings between the group of storage blocks and logical blocks are all cancelled, data in the storage blocks is invalid.

At block 508, in response to the cache indicator indicating the all-unmapped state, the storage manager 240 may fill the target storage block with zero. In the all-unmapped state, the storage blocks of the group are all in the unmapped state, so it is possible to obtain that the target storage block is in the unmapped state without accessing the metadata region 230 in the disk 220, thereby reducing extra access to the disk 220. In this case, it is possible to fill the target storage block with zero to avoid the influence of already-existing data on the target storage block on to-be-written data.

At block 510, the storage manager 240 may write, into the target storage block, data associated with the write request. Since the user completes access to the target storage block through the logical block corresponding to the target storage block, the write request actually achieves the mapping between the target storage block and the logical block. Thus, at block 512, after successful process a writing to the target storage block, the storage manager 240 needs to modify the target indicator indicating the state of the target storage block in the disk, the unmapped state to indicate the mapped state.

Since the target indicator indicating the unmapped state is modified to indicate the mapped state, the group of storage blocks becomes from the all-unmapped state to the hybrid state. Thus, at block 514, the storage manager 240 may modify the cache indicator in the cache 250 as indicating the hybrid state.

In the case that the cache indicator indicates the all-unmapped state, the storage manager 240 does not need to obtain the target indicator from the disk 220 before data is written to the target storage block, thereby reducing the number of times of extra access to the disk 220. This improves the speed of responding to the write request.

At block 516, in response to the cache indicator not representing the all-unmapped state, the storage manager 240 may determine whether the cache indicator indicates the all-mapped state. In the all-mapped state, the storage blocks of the group are all mapped to their respective logical blocks. Therefore, the storage manager 240 may determine that the target storage block is in the mapped state from the cache indicator in the cache.

At block 518, in response to the cache indicator representing the all-mapped state, the storage manager 240 directly writes to the target storage block the data associated with the read request, without accessing the target indicator in the disk. Since it is known from the cache indicator in the cache 250 that the target storage block is in the mapped state, it is unnecessary to access the target indicator in the metadata region 230 in the disk 220, thereby reducing the number of times of accessing the disk 220. Comparing with the conventional solution, this improves a speed of responding to the write request.

At block 520, in response to the cache indicator neither indicating the all-unmapped state nor indicating the all-mapped state, the storage manager 240 obtains, from the disk 220, the target indicator indicating the state of the target storage block, for example, obtains the target indicator from the metadata region 230.

At block 522, the storage manager 240 may determine whether the target indicator indicates a mapped state in which the target storage block is mapped to the logical block. At block 524, in response to the target indicator indicating the mapped state, the storage manager 524 may write to the target storage block the data associated with the write request.

At block 526, in response to the target indicator indicating that the unmapped state in which the mapping of the target storage block to the corresponding logical block is cancelled, the storage manager 240 may fill the target storage block with zero. In the case that the target storage block is in the unmapped state, the data in the target storage block is invalid. It is possible to fill the target storage block with zero to avoid the influence of invalid data on the to-be-written data.

At block 528, the storage manager 240 may write to the target storage block the data associated with the write request. Since the user completes access to the target storage block through the logical block corresponding to the target storage block, the write request actually achieves the mapping between the target storage block and the logical block. Thus, at block 530, after successful writing to the target storage block, the storage manager 240 needs to modify the target indicator indicating the state of the target storage block in the disk 220, the unmapped state to indicate the mapped state.

Since the target indicator indicating the unmapped state is modified to indicate the mapped state, it might cause the group of storage blocks become from the hybrid state to the all-mapped state. Thus, at block 532, the storage manager 240 may determine whether the modification of the target indicator from the unmapped state to the mapped state causes the all-mapped state so as to determine whether to modify the cache indicator.

At block 534, in response to the medication of the target indicator causing the all the storage blocks of the group in the all-mapped state, the storage manager 240 modifies the cache indicator in the cache as representing the all-mapped state.

In the embodiments of the present disclosure, it is possible to further divide the hybrid state into a first hybrid state and a second hybrid state. In the first hybrid state, the number of storage blocks in the group of storage blocks that are in the mapped state is less than a threshold number and the remaining storage blocks are in the unmapped state; in the second hybrid state, the number of storage blocks in the group of storage blocks that are in the mapped state is more than a threshold number and the remaining storage blocks are in the unmapped state. The threshold number may be pre-defined. If the cache indicator represents the second hybrid state, this indicates that the group of storage blocks is probably read or written in the future. To this end, in the embodiments of the present disclosure, it is possible to perform special processing for the second hybrid state to further improve the speed of responding to the request. The special processing will be described below in detail.

At block 536, in response to the target modification of indicator not causing the all-mapped state, the storage manager 240 may determine whether the modification of the target indicator causes the group of storage blocks become from the first hybrid state to the second hybrid state. If the number of storage blocks in the mapped state in the group of storage blocks before the modification is lower than the predetermined threshold number, whereas the number of storage blocks in the mapped state in the group of storage blocks after the modification is higher than the predetermined threshold number, the storage manager 240 may determine that the modification of the target indicator causes a change from the first hybrid state to the second hybrid state. In this case, the group of storage blocks might be accessed again in the near future. At block 538, the storage manager 240 changes the cache indicator to indicate the second hybrid state. In order to improve the speed of accessing any storage block in the group of storage blocks, at block 540, the storage manager 240 may start a timer. At block 542, in response to the timer expiring, the storage manager 240 may start background service to improve the access speed in the future by performing pre-filling for some storages blocks in the group of storage blocks. A specific process of the pre-filling service will be described below in detail with reference to FIG. 6.

In the method 500, for a write request, access to the target indicator in the disk 220 is performed before writing data only in the case that cache indicator indicates the hybrid state; in the case that the cache indicator indicates the all-mapped state and all-unmapped state, it is unnecessary to access the target indicator in the disk 220 before writing the data, thereby providing a quick response to the write request. In this way, times of extra access to the disk 220 are reduced generally, in the case that the input/output load is relatively heavy and the number of times of accessing the disk 220 per second is limited, a better input/output performance can be provided.

Figure 6:
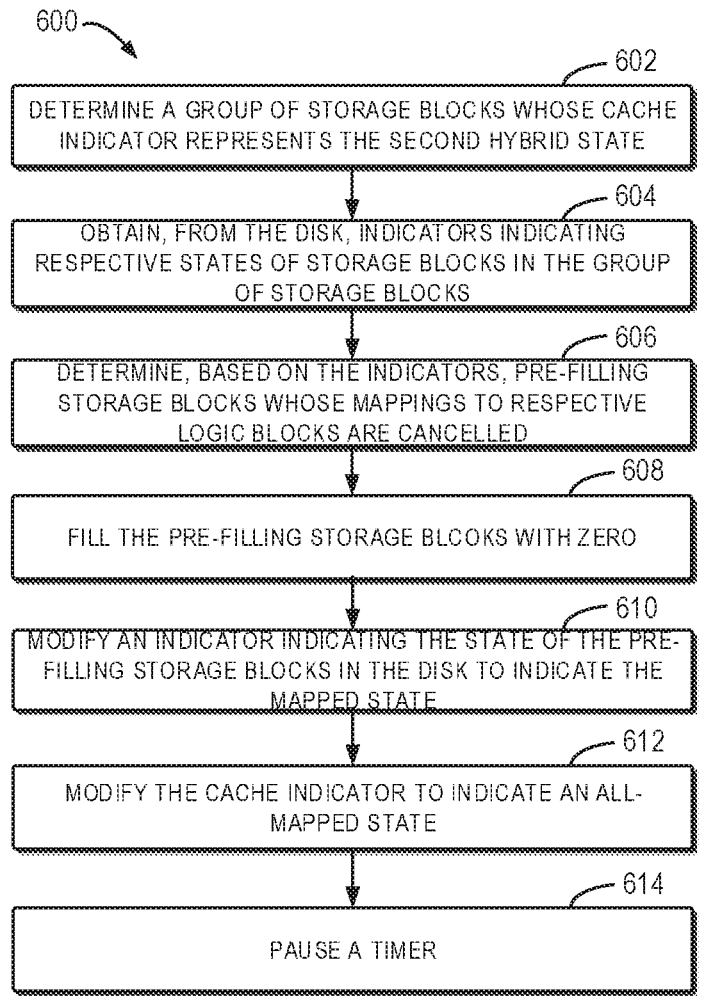
FIG. 6 illustrates a flow chart of a pre-filling method according to some embodiments of the present disclosure.

FIG. 6 illustrates a flow chart of a pre-filling method 600 according to some embodiments of the present disclosure. The method 600 may be executed by background service not shown in FIG. 2 when the system is free. A purpose of pre-filling is to pre-fill storage block with zero that are in the group of storage blocks probably to be accessed in the future and in the unmapped state, so as to improve the speed of responding to future access to any storage block in the group of storage blocks.

As shown in FIG. 5, if the cache indicator indicating the state of a group of storage blocks changes from the first hybrid state to the second hybrid state, this indicates that the group of storage blocks is probably accessed again in the future. In this case, a timer is started. If the timer expires, the background service is triggered to execute the method 600.

At block 602, the background service may determine from the cache 250 a group of storage blocks whose cache indicator represents the second hybrid state. As stated above, if a group of storage blocks is in the second hybrid state, this indicates that in the group of storage blocks, the number of storage blocks in the mapped state is more than the predetermined threshold number. In this case, the group of storage blocks is probably to be accessed again.

At block 604, the background service may obtain from the disk 220 indicators indicating respective states of storage blocks in the group of storage blocks. As stated above, these indicators indicate whether the corresponding storage blocks are in the mapped state or in the unmapped state.

At block 606, the background service can, based on these indicators, determine the pre-filling storage blocks whose mappings to respective logical blocks are cancelled. The background service may regard the storage blocks in the unmapped state as the pre-filling storage blocks. The existence of the pre-filling storage blocks cause the group of storage blocks in the hybrid state so that the state of a certain storage block in the group of storage blocks cannot be obtained from the cache indicator, such that the state of the storage block must be obtained by accessing the disk 220. This causes it necessary to perform extra access to the disk 220 upon accessing any storage block in the group of storage blocks in the future. Therefore, the background service, when being free, may determine these pre-filled storage blocks, and perform pre-filling for them, thereby further reducing extra access to the disk 220.

At block 608, the background service fill the pre-filling storage blocks with zero to erase already-existing data in the pre-filling storage blocks, without affecting data to be written in the future. At block 610, the background service may modify an indicator indicating the state of the pre-filling storage blocks in the disk, the unmapped state to indicate the mapped state.

At block 612, the background service may modify the cache indicator indicating the state of the group of storage blocks in the cache 250 from the second hybrid state to the all-mapped state. Since the group of storage blocks are probably accessed again in the future, the cache indicator associated therewith is modified to the all-mapped state so that when any storage block in the group of storage blocks is accessed again, it is possible to respond to the further access without accessing the metadata region 230 of the disk 220, thereby improving the response speed.

At block 614, the background service may pause the timer to wait for a next pre-filling. For example, when the storage manager 240 determines that the cache indicator of another group of storage blocks indicating the first hybrid state is modified to indicate the second hybrid state, the timer may be started again.

In method 600, the background service, when free, performs pre-filling for storage blocks that are in the unmapped state in a group of storage blocks that are probably accessed in the future, the group of storage blocks is in the all-mapped state after the pre-filling. As such, when any storage block in the group of storage blocks is accessed in the future, it is not necessary to access the metadata region in the disk, thereby further reducing the number of times of accessing the disk and improving the response speed.

In the embodiments of the present disclosure, it is possible to use a number of bits in the cache 250 to represent the state of the group of storage blocks which in number is less than the number of storage blocks of a group of storage blocks, thereby reducing the number of times of accessing the metadata region 230 of the disk 220 and thereby improving the speed of responding the access. As stated above, when responding to the read/write request, it is sometimes necessary to modify the cache indicator indicating the state of the group of storage blocks in the cache. The change of the cache indicator will be described with reference to FIG. 7.

Figure 7:
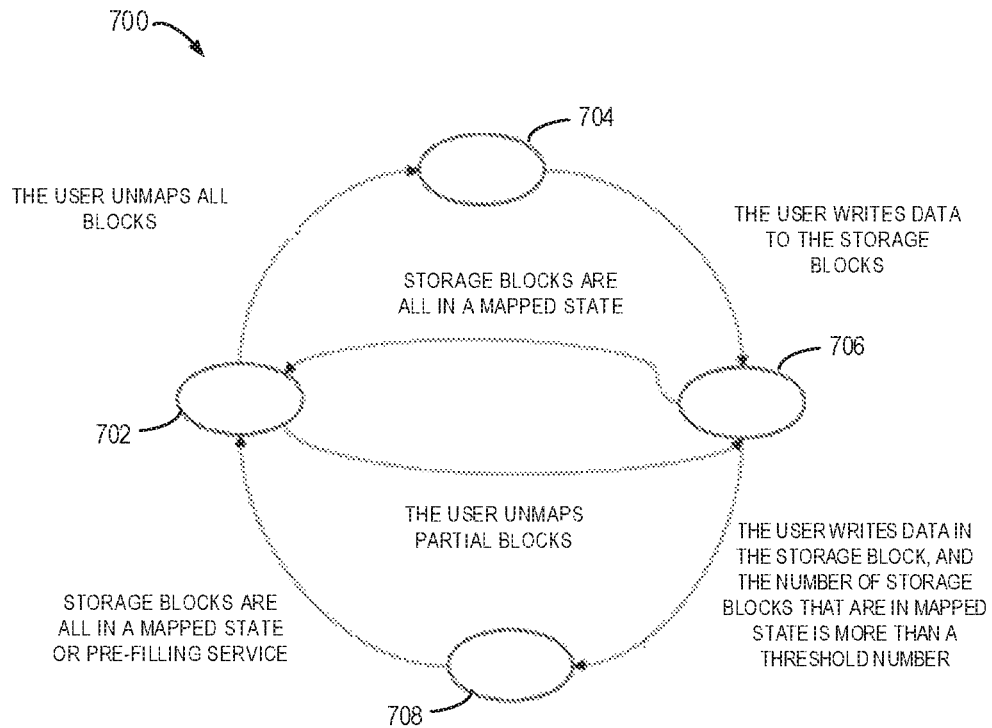
FIG. 7 illustrates a schematic diagram of a state machine using a cache indicator according to some embodiments of the present disclosure.

FIG. 7 illustrates a schematic diagram of a state machine 700 for a cache indicator according to some embodiments of the present disclosure. As shown in FIG. 7, the cache indicator in the cache 250 may represent an all-mapped state 702 in which storage blocks in a group of storage blocks are all in the mapped state, an all-unmapped state 704 in which storage blocks in the group of storage blocks are all in the unmapped state, a first hybrid state 706 in which the number of storage blocks in the group of storage blocks that are in the mapped state is less than a threshold number and the remaining storage blocks are in the unmapped state, and a second hybrid state 708 in which the number of storage blocks in the group of storage blocks that are in the mapped state is more than the threshold number and the remaining storage blocks are in the unmapped state.

When a group of storage blocks are in the all-unmapped state 704, after a user successfully writes data into the storage blocks in the group of storage blocks, the cache indicator indicating the all-unmapped state 704 is modified to indicate the first hybrid state 706.

When the group of storage blocks are in the first hybrid state 706, if the user continues to write data into the storage blocks in the group of storage blocks which causes the number of storage blocks to be in the mapped state is more than the threshold number, and the cache indicator indicating the first hybrid state 706 is modified to indicate the second hybrid state 708. When the group of storage blocks is in the first hybrid state 706, if the write request causes the storage blocks in the group of storage blocks to be in the mapped state, the cache indicator indicating the first hybrid state 706 is modified to indicate the all-mapped state 702.

When the group of storage blocks is in the second hybrid state 708, if the write request causes the all storage blocks of the group in the mapped state or being pre-filled, the cache indicator indicating the second hybrid state 708 is modified to indicate the all-mapped state 702.

When the group of storage blocks are in the all-mapped state 702, if the user cancels the mappings of all blocks in the group to respective logical blocks, the cache indicator indicating the all-mapped state 702 is modified to indicate the all-unmapped state. When the group of storage blocks is in the all-mapped state 702, if the user cancels the mappings of a part of the storage blocks in the group to respective logical blocks, the cache indicator indicating the all-mapped state 702 is modified to indicate the first hybrid state 706.

When the cache indicator indicates the all-unmapped state 704 and all-mapped state 702, before reading data or writing data, it is not necessary to access the metadata region 230 in the disk 220, thereby reducing the number of times of accessing the disk 220. When the cache indicator indicating the first hybrid state 706 is modified to indicate the second hybrid state 708, it is possible to modify the cache indicator to the all-mapped state 702 through the pre-filling service so as to reduce the number of times of accessing the disk when any storage block in the group of storage blocks is accessed in the future. In this way, it is possible to improve the speed of responding to the read/write request in the storage system to which the UNMAP command is introduced.

Figure 8:
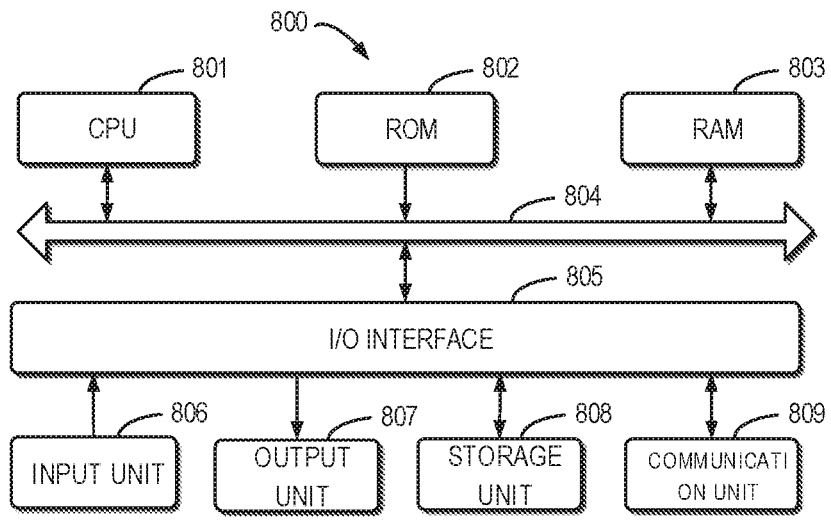
FIG. 8 illustrates an example apparatus for implementing the embodiments of the present disclosure.

FIG. 8 illustrates a block diagram of an example apparatus 800 for implementing the embodiments of the present disclosure. The storage manager 240 shown in FIG. 2 can be implemented by the apparatus 800. As shown in FIG. 8, the apparatus 800 includes a central processing unit (CPU) 801 which is capable of executing various actions and processing based on the computer program instructions stored in a read only memory (ROM) 802 or computer program instructions loaded from a storage unit 808 to a random access memory (RAM) 803. The RAM 803 can also store various kinds of programs and data needed by the operations of the apparatus 800. The CPU 801, the ROM 802 and the RAM 803 are connected to one another via a bus 804. An input/output (I/O) interface 805 is also connected to the bus 804. In accordance with certain embodiments, other types of electronic equipment are used in place of and/or in combination with the electronic circuitry described above.

The following components in the apparatus 800 are connected to the I/O interface 805: an input unit 806 such as a keyboard, a mouse, or the like; an output unit 807 such as various displays and loudspeakers; a storage unit 808 such as a magnetic disk or an optical disk; and a communication unit 809 such as a network card, a modem or a wireless communication transceiver. The communication unit 809 allows the apparatus 800 to exchange information/data with other devices via for example an Internet computer network and/or various telecommunication networks.

Each of the procedures and processes described above, such as the method 300, method 400, method 500 and/or method 600, can be executed by the processing unit 801. For example, in some embodiments, the method 300, method 400, method 500 and/or method 600 can be implemented as computer software programs tangibly included in a machine-readable media such as the storage unit 808. In some embodiments, the computer program can be partially or fully loaded and/or installed on the apparatus 800 via the ROM 802 and/or the communication unit 809. When a computer program is loaded to the RAM 803 and executed by the CPU 801, one or more steps of the method 300, method 400, method 500 and/or method 600 descried above can be executed. Alternatively, in some other embodiments, the CPU 801 can be configured to implement the above method 300, method 400, method 500 and/or method 600 in any other proper manners (e.g., by using a firmware).

Functions described above in the text can be at least partially implemented by one or more hardware logical components. For example, types of the hardware logical components that can be used may include, but are not limited to, a field-programmable gate arrays (FPGA), an Application Specific Integrated Circuit (ASIC), an Application Specific Standard Product (ASSP), a System on Chip (SOC), a Complex Programmable Logic Device (CPLD) and the like.

Computer program code for implementing the method of the subject matter described herein may be complied with one or more programming languages. These computer program codes may be loaded to a general-purpose computer, a dedicated computer or a processor of other programmable data processing apparatuses, to cause the functions/operations prescribed in the flow charts and/or block diagrams to be performed when the program code is executed by the computer or other programmable data processing apparatuses. The program code may be executed completely on a machine, partly on a machine, partly on a machine as an independent software packet and partly on a remote machine, or completely on a remote machine or a server.

In the context of the subject matter described herein, the machine-readable medium may be any tangible medium including or storing a program for or about an instruction executing system, apparatus or device. The machine-readable medium may be a machine-readable signal medium or a machine-readable storage medium. The machine-readable medium may include, but not limited to, an electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, a hard disk, a random-access memory (RAM), a read-only memory (ROM), an erasable programmable read-only memory (EPROM or flash memory), an optical storage device, a magnetic storage device, or any appropriate combination thereof.

Besides, although the operations are depicted in a particular order, it should not be understood that such operations are completed in a particular order as shown or in a successive sequence, or all shown operations are executed so as to achieve a desired result. In some cases, multi-task or parallel-processing would be advantageous. Likewise, although the above discussion includes some specific implementation details, they should not be explained as limitations to the scope of the disclosure. Some features described in the context of separate embodiments may also be combined and be realized in a single implementation. On the contrary, various features described in the context of a single implementation may also be realized in a plurality of implementations separately or in any suitable sub-group.

Although the subject matter of the present disclosure has been described in language specific to structural features and/or methodological actions, it should be understood that the subject matter specified in appended claims are not limited to the specific features or actions described above. Rather, the specific features and actions described above are disclosed as examples for implementing the claims.

We claim:

1. In electronic equipment, a storage management method, comprising:
    maintaining a set of on-disk indicators and a cache indicator for a group of storage blocks in a disk, the on-disk indicators including per-block mapping indicators each indicating a mapping state of a respective storage block of the group, the cache indicator indicating an overall mapping state for the group of storage blocks, the overall mapping state selected from (1) an all-mapped state when all the storage blocks of the group are mapped, (2) an all-unmapped state when all the storage blocks of the group are unmapped, and (3) a hybrid state when some of the storage blocks of the group are mapped and others of the storage blocks of the group are unmapped;
    receiving a request for a target storage block of the group of storage blocks;
    obtaining, from a cache, the cache indicator indicating the state of the group of storage blocks including the target storage block; and
    responding to the request based on the cache indicator, by (1) when the cache indicator indicates the all-mapped state and when it indicates the all-unmapped state, then responding to the request without accessing the per-block mapping indicator for the target block, and (2) when the cache indicator indicates the hybrid state, then first obtaining the per-block mapping indicator for the target block and then responding to the request based on the per-block mapping indicator.

2. The method according to claim 1, wherein the request is a read request, and responding to the request based on the cache indicator comprises:

in response to the cache indicator indicating the all-unmapped state in which mappings of the group of storage blocks to respective logical blocks are all cancelled, providing a zero pattern, without accessing the per-block mapping indicator indicating the state of the target storage block in the disk.

3. The method according to claim 1, wherein the request is a read request, and responding to the request based on the cache indicator comprises:

in response to the cache indicator indicating the all-mapped state in which the storage blocks of the group are all mapped to respective logical blocks, reading, from the target storage block, data associated with the read request, without accessing the per-block mapping indicator indicating the state of the target storage block in the disk.

4. The method according to claim 1, wherein the request is a read request, and responding to the request based on the per-block mapping indicator comprises:

in response to the per-block mapping indicator indicating a mapped state in which the target storage block is mapped to a target logical block, reading, from the target storage block, data associated with the request; and in response to the per-block mapping indicator indicating an unmapped state in which mapping of the target storage block to the target logical block is cancelled, providing a zero pattern.

5. The method according to claim 1, wherein the request is a write request, and responding to the request based on the cache indicator comprises:

in response to the cache indicator indicating the all-unmapped state in which mappings of the group of storage blocks to respective logical blocks are all cancelled, filling the target storage block with zero;

writing, to the target storage block, data associated with the write request;

modifying the per-block mapping indicator indicating the state of the target storage block in the disk to indicate a mapped state in which the target storage block is mapped to a target logical block; and modifying the cache indicator to indicate the hybrid state in which a first portion of storage blocks in the group of storage blocks are mapped to respective logical blocks and mappings of a second portion of storage blocks in the group of storage blocks to respective logical blocks are cancelled.

6. The method according to claim 1, wherein the request is a write request, and responding to the request based on the cache indicator comprises:

in response to the cache indicator indicating the all-mapped state in which the storage blocks of the group are all mapped to respective logical blocks, writing, to the target storage block, data associated with the write request, without accessing the per-block mapping indicator indicating the state of the target storage block in the disk.

7. The method according to claim 1, wherein the request is a write request, and responding to the request based on the per-block mapping indicator comprises:

in response to the per-block mapping indicator indicating a mapped state in which the target storage block is mapped to a target logical block, writing, to the target storage block, data associated with the write request.

8. The method according to claim 7, further comprising:

in response to the per-block mapping indicator indicating an unmapped state in which mapping of the target storage block to the target logical block is cancelled, filling the target storage block with zero;

writing, to the target storage block, the data associated with the write request;

modifying the per-block mapping indicator as indicating the mapped state; and in response to a modification of the per-block mapping indicator causing an all-mapped state in which the storage blocks of the group are all mapped to respective logical blocks, modifying the cache indicator to indicate the all-mapped state.

9. The method according to claim 8, wherein the hybrid state comprises a first hybrid state in which the number of storage blocks in the group of storage blocks that are mapped to respective logical blocks is less than a threshold number, and a second hybrid state in which the number of storage blocks in the group of storage blocks that are mapped to respective logical blocks is higher than the threshold number, the cache indicator indicating the first hybrid state, the method further comprising:

in response to the modification of the per-block mapping indicator causing the second hybrid state, modifying the cache indicator indicating the first hybrid state to indicate the second hybrid state.

10. The method according to claim 9, further comprising:

in response to that the cache indicator indicating the first hybrid state is modified to indicate the second hybrid state, starting a timer; and in response to the timer expiring, triggering a background service that:

obtains, from the disk, the per-block mapping indicators indicating respective states of the storage blocks in the group of storage blocks;

determines, based on the per-block mapping indicators, pre-filling storage blocks in the group of storage blocks whose mappings to respective logical blocks are cancelled;

fills the pre-filling storage blocks with zero;

modifies per-block mapping indicators indicating states of the pre-filling storage blocks in the disk to indicate the mapped state in which the pre-filling storage blocks are mapped to respective logical blocks; and modifies the cache indicator to indicate the all-mapped state in which the group of storage blocks are all mapped to respective logical blocks.

11. An electronic device, comprising:

a processor; and a memory storing instructions therein, the instructions, when executed by the processor, causing the electronic device to perform the following acts:

maintaining a set of on-disk indicators and a cache indicator for a group of storage blocks in a disk, the on-disk indicators including per-block mapping indicators each indicating a mapping state of a respective storage block of the group, the cache indicator indicating an overall mapping state for the group of storage blocks, the overall mapping state selected from (1) an all-mapped state when all the storage blocks of the group are mapped, (2) an all-unmapped state when all the storage blocks of the group are unmapped, and (3) a hybrid state when some of the storage blocks of the group are mapped and others of the storage blocks of the group are unmapped;

receiving a request for a target storage block of the group of storage blocks;

obtaining, from a cache, the cache indicator indicating the state of the group of storage blocks including the target storage block; and responding to the request based on the cache indicator, by (1) when the cache indicator indicates the all-mapped state and when it indicates the all-unmapped state, then responding to the request without accessing the per-block mapping indicator for the target block, and (2) when the cache indicator indicates the hybrid state, then first obtaining the per-block mapping indicator for the target block and then responding to the request based on the per-block mapping indicator.

12. The electronic device according to claim 11, wherein the request is a read request, and responding to the request based on the cache indicator comprises:

in response to the cache indicator indicating the all-unmapped state in which mappings of the group of storage blocks to respective logical blocks are all cancelled, providing a zero pattern, without accessing the per-block mapping indicator indicating the state of the target storage block in the disk.

13. The electronic device according to claim 11, wherein the request is a read request, and responding to the request based on the cache indicator comprises:

in response to the cache indicator indicating the all-mapped state in which the storage blocks of the group are all mapped to respective logical blocks, reading, from the target storage block, data associated with the read request, without accessing the per-block mapping indicator indicating the state of the target storage block in the disk.

14. The electronic device according to claim 11, wherein the request is a read request, and responding to the request based on the per-block mapping indicator comprises:

in response to the per-block mapping indicator indicating a mapped state in which the target storage block is mapped to a target logical block, reading, from the target storage block, data associated with the request; and in response to the per-block mapping indicator indicating an unmapped state in which mapping of the target storage block to the target logical block is cancelled, providing a zero pattern.

15. The electronic device according to claim 11, wherein the request is a write request, and responding to the request based on the cache indicator comprises:

in response to the cache indicator indicating the all-unmapped state in which mappings of the group of storage blocks to respective logical blocks are all cancelled, filling the target storage block with zero;

writing, to the target storage block, data associated with the write request;

modifying the per-block mapping indicator indicating the state of the target storage block in the disk to indicate a mapped state in which the target storage block is mapped to a target logical block; and modifying the cache indicator to indicate the hybrid state in which a first portion of storage blocks in the group of storage blocks are mapped to respective logical blocks and mappings of a second portion of storage blocks in the group of storage blocks to respective logical blocks are cancelled.

16. The electronic device according to claim 11, wherein the request is a write request, and responding to the request based on the cache indicator comprises:

in response to the cache indicator indicating the all-mapped state in which the storage blocks of the group are all mapped to respective logical blocks, writing, to the target storage block, data associated with the write request, without accessing the per-block mapping indicator indicating the state of the target storage block in the disk.

17. The electronic device according to claim 11, wherein the request is a write request, and responding to the request based on the per-block mapping indicator comprises:

in response to the per-block mapping indicator indicating a mapped state in which the target storage block is mapped to a target logical block, writing, to the target storage block, data associated with the write request.

18. The electronic device according to claim 17, wherein the acts further comprise:

in response to the per-block mapping indicator indicating an unmapped state in which mapping of the target storage block to the target logical block is cancelled, filling the target storage block with zero;

writing, to the target storage block, data associated with the write request;

modifying the per-block mapping indicator as indicating the mapped state; and in response to the modification of the per-block mapping indicator causing an all-mapped state in which the storage blocks of the group are all mapped to respective logical blocks, modifying the cache indicator as indicating the all-mapped state.

19. The electronic device according to claim 18, wherein the hybrid state comprises a first hybrid state in which the number of storage blocks in the group of storage blocks that are mapped to respective logical blocks is less than a threshold number logical block and a second hybrid state in which the number of storage blocks in the group of storage blocks that are mapped to respective logic blocks is higher than the threshold number logical block, the cache indicator indicating the first hybrid state, the electronic device further comprising:

in response to the modification of the per-block mapping indicator causing the second hybrid state, modifying the cache indicator indicating the first hybrid state to indicate the second hybrid state.

20. The electronic device according to claim 19, wherein the acts further comprise:

in response to that the cache indicator indicating the first hybrid state is modified to indicate the second hybrid state, starting a timer;

in response to the timer expiring, triggering a background service that:

obtains, from the disk, the per-block mapping indicators indicating respective states of the storage blocks in the group of storage blocks;

determines, based on the indicators, pre-filling storage blocks in the group of storage blocks whose mappings to respective logical blocks are cancelled;

fills the pre-filling storage blocks with zero;

modifies per-block mapping indicators indicating states of the pre-filling storage blocks in the disk to indicate the mapped state in which the pre-filling storage blocks are mapped to respective logical blocks; and modifies the cache indicator to indicate the all-mapped state in which the group of storage blocks are all mapped to respective logical blocks.

21. A computer program product having a non-transitory computer readable medium which stores a set of instructions to perform storage management; the set of instructions, when carried out by computerized circuitry, causing the computerized circuitry to perform a method of:

maintaining a set of on-disk indicators and a cache indicator for a group of storage blocks in a disk, the on-disk indicators including per-block mapping indicators each indicating a mapping state of a respective storage block of the group, the cache indicator indicating an overall mapping state for the group of storage blocks, the overall mapping state selected from (1) an all-mapped state when all the storage blocks of the group are mapped, (2) an all-unmapped state when all the storage blocks of the group are unmapped, and (3) a hybrid state when some of the storage blocks of the group are mapped and others of the storage blocks of the group are unmapped;

receiving a request for a target storage block of the group of storage blocks;

obtaining, from a cache, the cache indicator indicating the state of the group of storage blocks including the target storage block; and responding to the request based on the cache indicator, by (1) when the cache indicator indicates the all-mapped state and when it indicates the all-unmapped state, then responding to the request without accessing the per-block mapping indicator for the target block, and (2) when the cache indicator indicates the hybrid state, then first obtaining the per-block mapping indicator for the target block and then responding to the request based on the per-block mapping indicator.

* * * * *